United States Patent
Thakur et al.

(10) Patent No.: US 9,669,327 B2
(45) Date of Patent: Jun. 6, 2017

(54) VAPOR-LIQUID CONTACT TRAY INCLUDING INTERLOCKING JOINT

(71) Applicant: GTI SOLUTIONS INTERNATIONAL LLC, Flower Mound, TX (US)

(72) Inventors: Naresh Thakur, Seoul (KR); Ian Buttridge, Garland, TX (US); Seunghyun Hwang, Seoul (KR)

(73) Assignee: GTI SOLUTIONS INTERNATIONAL, LLC, Flower Mound, TX (US)

( * ) Notice: Subject to any disclaimer, the term of this patent is extended or adjusted under 35 U.S.C. 154(b) by 0 days.

(21) Appl. No.: 15/095,042

(22) Filed: Apr. 9, 2016

(65) Prior Publication Data

US 2016/0296854 A1    Oct. 13, 2016

Related U.S. Application Data

(60) Provisional application No. 62/146,112, filed on Apr. 10, 2015.

(51) Int. Cl.
*B01F 3/04* (2006.01)
*B01D 3/32* (2006.01)
*B01D 53/18* (2006.01)

(52) U.S. Cl.
CPC .............. *B01D 3/324* (2013.01); *B01D 53/18* (2013.01)

(58) Field of Classification Search
CPC ..... B01D 3/324; B01D 53/18; B01F 3/04078; B01F 3/04496; B01F 15/00922
USPC ............................................. 261/114.1, 114.5
See application file for complete search history.

(56) References Cited

U.S. PATENT DOCUMENTS

| | | | | |
|---|---|---|---|---|
| 6,068,244 A * | 5/2000 | Burton | .................. | B01D 3/324 261/114.4 |
| 6,592,106 B1 * | 7/2003 | Eaton, Jr. | ............... | B01D 3/324 261/114.3 |
| 7,270,315 B2 * | 9/2007 | Burton | .................. | B01D 3/324 261/114.1 |
| 7,287,746 B2 * | 10/2007 | Fehr | ......................... | B01D 3/20 261/114.5 |
| 8,413,967 B2 * | 4/2013 | Johnson | ................. | B01D 3/324 261/113 |
| 8,480,062 B2 * | 7/2013 | Kim | ........................ | B01D 3/324 261/114.1 |

* cited by examiner

*Primary Examiner* — Charles Bushey

(57) ABSTRACT

A separation system can include one or more vapor-liquid contact trays. A vapor-liquid contact tray can include a set of panels. Two adjacent panels can be connected at a joint at overlapping edges of the panels. The first panel can include slots extending through the first panel proximal to a first offset bend. Tabs of the first panel can extend downward toward an underside of the first panel. The tabs can originate from an edge of the slots proximal to the deck and extend downward relative to a horizontal plane of the deck. The second panel can include a plurality of strips that have a second offset bend extending from a deck of the second panel extending through a slot and to underlie the first panel. A strip of the plurality of strips can define an opening through which a tab of the first panel can extend.

20 Claims, 3 Drawing Sheets

VAPOR-LIQUID CONTACT TRAY INCLUDING INTERLOCKING JOINT

CROSS-REFERENCE TO RELATED APPLICATION(S)

This application claims benefit of U.S. Provisional Application No. 62/146,112, filed Apr. 10, 2015, which is incorporated herein by reference in its entirety.

FIELD OF THE DISCLOSURE

This disclosure, in general, relates to vapor-liquid contact trays including panels connected at interlocking joints, separation systems including such vapor-liquid contact trays, and methods of assembling such vapor-liquid contact trays.

BACKGROUND

There is a large worldwide demand for refined chemicals and products made using such refined chemicals. In an effort to refine or separate compounds from undesirable byproducts or impurities, chemical facilities often use vapor-liquid separations processes, such as distillation, stripping, or absorption. Such separations processes can utilize vapor-liquid contact trays, among other equipment. As such, there is a large demand for vapor-liquid contact equipment, including vapor-liquid contact trays.

Vapor-liquid contact trays are oftentimes deployed in cylindrical column structures. As such, the contact trays are assembled within rigid columns, providing limited space and flexibility for maneuvering panels and equipment. Moreover, owing to the remote locations of many chemical facilities, the assembly of vapor-liquid contact trays within columns is subject to outdoor environmental conditions, often in inhospitable climates. Accordingly, assembling vapor-liquid contact trays in limited spaces under harsh conditions is a difficult undertaking.

As such, an improved vapor-liquid contact tray would be desirable.

SUMMARY

In an exemplary embodiment, a separation system, such as a separation column, can include one or more vapor-liquid contact trays. Each of the vapor-liquid contact trays can include a set of panels. In an example, two adjacent panels can be connected at a joint at overlapping edges of the panels. The panels can include vapor flow elements, such as vapor flow valves, bubble caps, sieve tray perforations, or a combination thereof. Proximal to the joint, a first panel can include an offset bend extending from a deck to a support portion that is to extend to underlie a second panel. The first panel can include slots extending through the first panel proximal to the first offset bend. In addition, tabs of the first panel can extend downward toward an underside of the first panel. The tabs can be associated with the slots. For example, the tabs can originate from an edge of the slots proximal to the deck and extend downward relative to a horizontal plane of the deck. The second panel can include a plurality of strips that have a second offset bend extending from a deck of the second panel to a distal portion extending through a slot and to underlie the first panel. Each strip can define an opening through which a tab of the first panel can extend when the joint is assembled.

To assemble an exemplary contact tray, the first panel can be secured within a column. For example, the first panel can be secured to a wall of the column. The first panel, at an edge away from the column wall, can include the offset bend extending from the deck of the first panel to the support portion. The first panel can include slots extending through the panel proximal to the offset bend, and a plurality of tabs can extend downward toward an underside of the first panel. The tabs can be associated with the slots. The second panel can include an edge having a plurality of strips extending from the deck of the second panel to a distal portion of the strips. The second panel can be tilted, and the strips can be applied through the slots of the first panel, and, with maneuvering, openings defined by the strips can engage the tabs of the first panel. The second panel can be secured to additional panels or can be secured to a wall of the column. A liquid receiving panel or downcomer panel can be applied to other edges of the first or second panels.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a separation system, such as a separation column, can include one or more vapor-liquid contact trays. Each of the vapor-liquid contact trays can include a set of panels. In an example, two adjacent panels can be connected at a joint at overlapping edges of the panels. The panels can include vapor flow elements, such as vapor flow valves, bubble caps, sieve tray perforations, or a combination thereof, which can assist with vapor-liquid contact. Proximal to the joint, a first panel can include an offset bend extending from a deck to a support portion that is to extend to underlie a second panel. The first panel can include slots extending through the first panel proximal to the first offset bend. In addition, tabs of the first panel can extend downward toward an underside of the first panel. The tabs can be associated with the slots. For example, the tabs can originate from an edge of the slots proximal to the deck and extend downward relative to a horizontal plane of the deck. The second panel can include a plurality of strips that have a second offset bend extending from a deck of the second panel to a distal portion extending through a slot and to underlie the first panel. Each strip can define an opening through which a tab of the first panel can extend when the joint is assembled.

To assemble an exemplary contact tray, the first panel can be secured within a column. For example, the first panel can be secured to a support ring welded to a wall of the column. The first panel, at an edge away from the column wall, can include the offset bend extending from the deck of the first panel to the support portion. The first panel can include slots extending through the panel proximal to the offset bend, and a plurality of tabs can extend downward toward an underside of the first panel. The tabs can be associated with the slots. The second panel can include an edge having a plurality of strips extending from the deck of the second panel to a distal portion of the strips. The strips can be applied through the slots of the first panel, and openings defined by the strips can engage the tabs of the first panel. The second panel can be secured to additional panels or can be secured to a wall of the column. A liquid receiving panel or downcomer panel can be applied to other edges of the first or second panels.

The exemplary separation system and contact tray can be used in vapor-liquid separations processes. For example, in practice, a multicomponent stream can be fed to the separation system or separation column. As the liquid flows down the column from tray to tray and vapor or gas flows up through trays, components of the multicomponent stream concentrate either at the top or at the bottom of the column. A concentrated compound can be drawn from the column, for example, from a reflux container, a condenser, or from a boiler.

Figure 1:
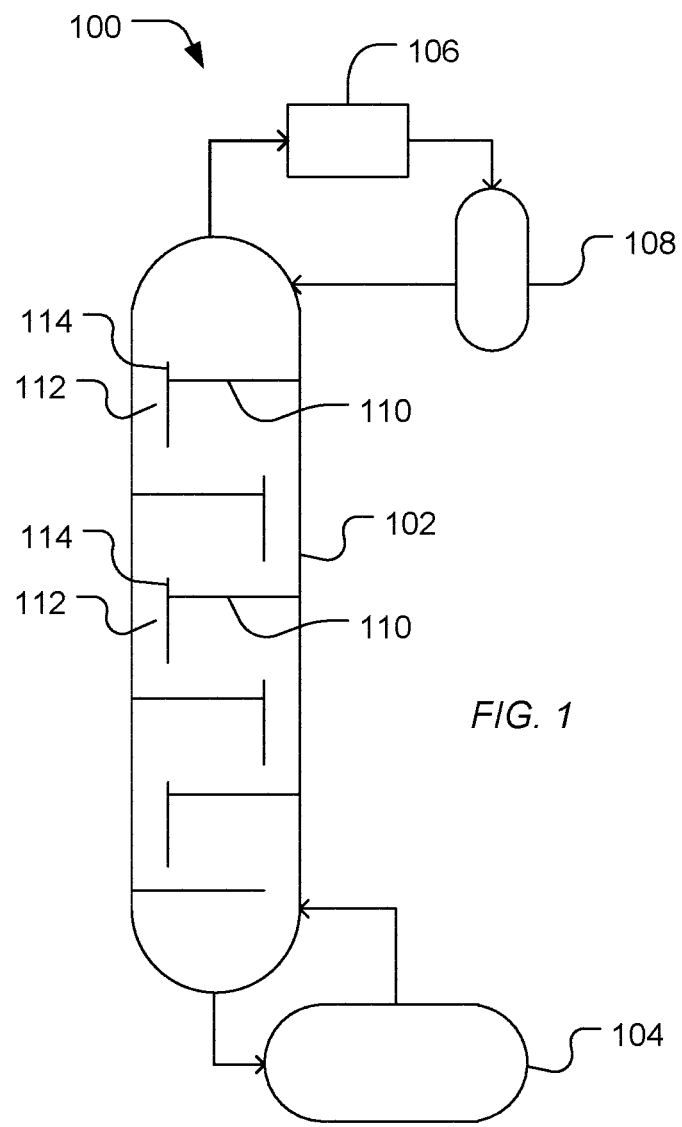
FIG. 1 includes an illustration of an exemplary vapor-liquid contact column.

As illustrated in FIG. 1, a separation device 100 can include a column 102. The column 102 at the top can be in fluid communication with a condenser 106. In particular, vapor or gas from the column 102 flows to the condenser 106 to be condensed into a liquid which flows into a reflux container 108, and optionally, a portion of the reflux flows back to the column 102 as a liquid. The column 102, for example, can be in fluid communication with a boiler 104. For example, liquid flows from the bottom of the column 102 to the boiler 104 where at least a portion of the liquid can be vaporized and returned to the column 102 as a gas or vapor.

The column 102 can include a plurality of trays 110. Each tray 110 can optionally include a downcomer 112 in which liquid flows from the tray to the liquid receiving area of a lower tray. In further example, the tray 110 can also include a weir 114 that defines a liquid height for retaining liquid on the tray. Alternatively, the tray can be designed without a weir 114.

Figure 2:
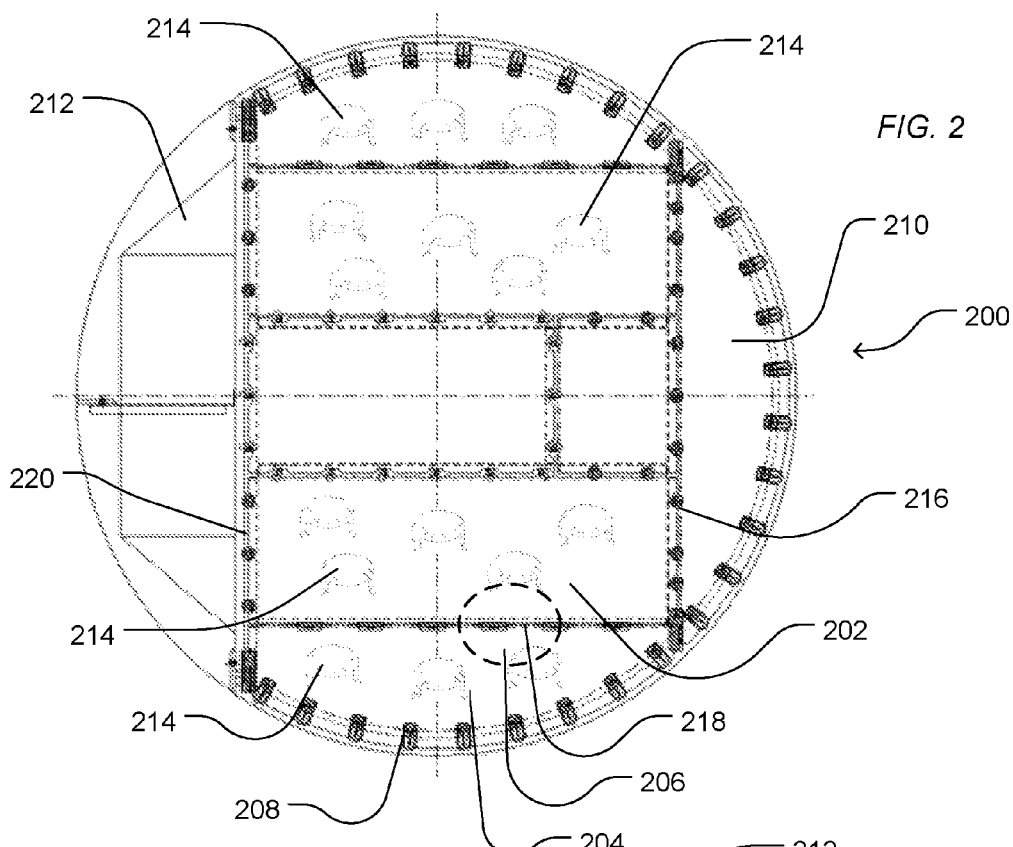
FIG. 2 includes an illustration of an exemplary vapor-liquid contact tray.

Each of the trays 110 can be formed from one or more panels that include perforations and, optionally elements applied over the perforations. Panels of the trays 110 can connect to one another at a joint. FIG. 2 includes an illustration of an exemplary vapor-liquid contact tray 200. The vapor-liquid contact tray 200 can include panels that include vapor flow elements 214, such as vapor flow valves, bubble caps, sieve tray perforations, the like, or a combination thereof, which can assist with vapor liquid contact, such as through the formation of vapor-liquid interface surface area, e.g., with bubbles. In a particular example, the vapor-liquid contact tray 200 includes a panel 202 and a panel 204. One or both of the panels (202 or 204) can include vapor flow elements 214. As illustrated, the panel 204 is secured to a tray support 208. The tray support 208 can be a tray ring or ledge and, in an example, can be welded to a tower shell. In addition, the panel 204 can be secured to the panel 202 at overlapping edges 218 of the panels 202 or 204 that form a joint 206.

In addition, a liquid receiving panel 210 can be secured to an edge 216 of the panels 202 or 204. For example, the liquid receiving panel 210 can be secured to an edge 216 that is orthogonal to the overlapping edges 218 of the joint 206. In further example, a downcomer 212 can be secured to an edge 220 of one or both of the panels 202 or 204, for example, at an edge 220 orthogonal to the overlapping edges 218 associated with the joint 206. The liquid received at the liquid receiving panel 210 can flow across the vapor-liquid contact panel 202 to the downcomer 212. As the liquid crosses the panels (e.g., panels 202 or 204), liquid is contacted with vapor flowing through the vapor flow elements 214.

Figure 3:
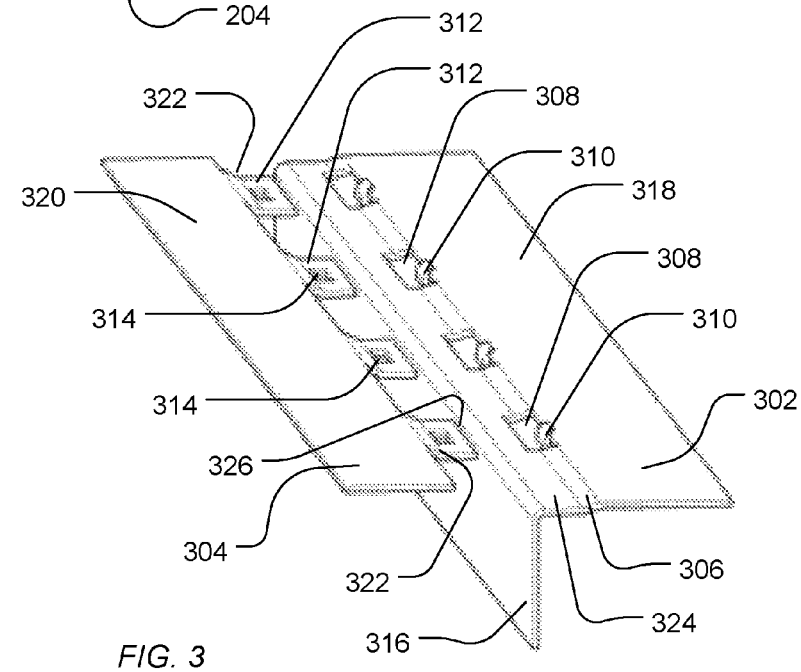
FIG. 3, FIG. 4, and FIG. 5 include illustrations of a portion of an exemplary vapor-liquid contact tray.
Figure 4:
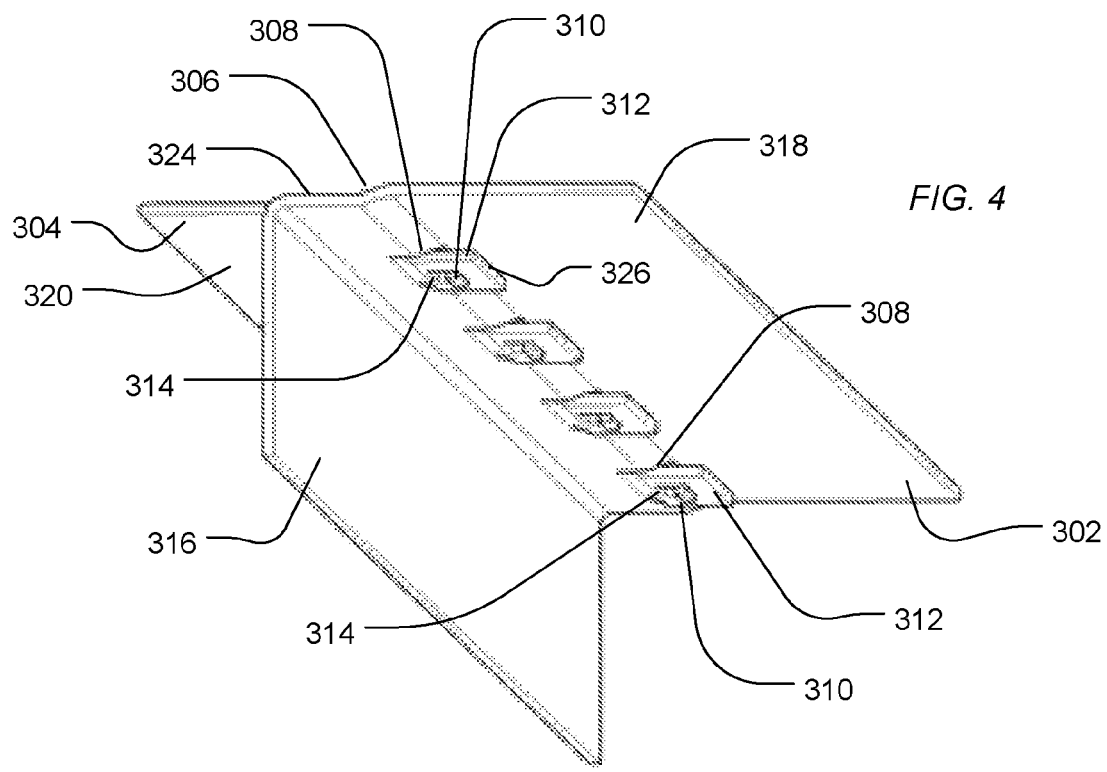
Figure 5:
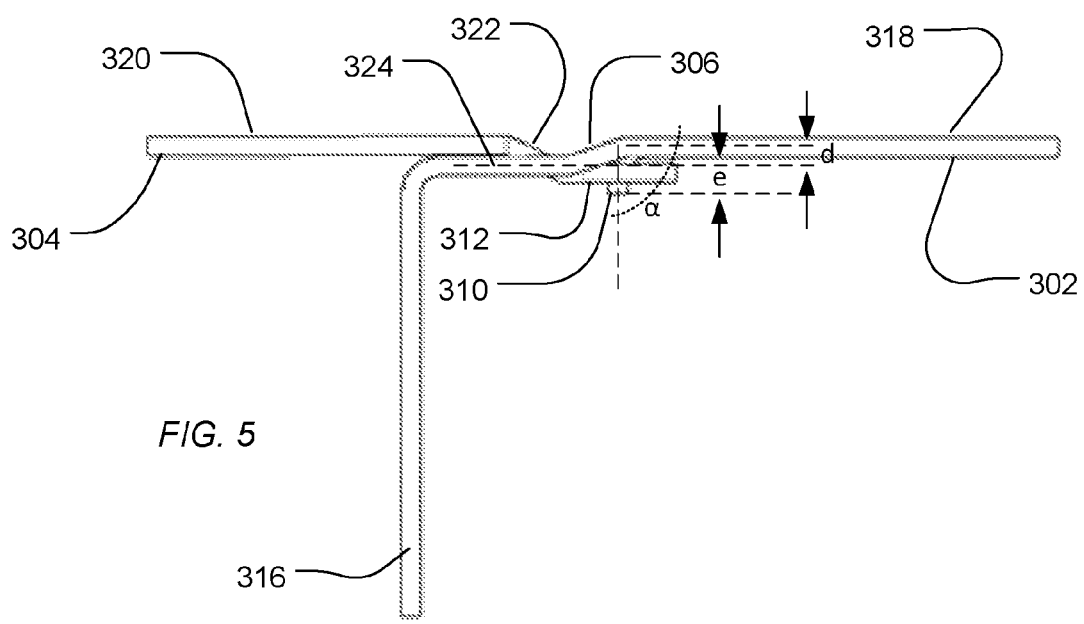

FIG. 3, FIG. 4, and FIG. 5 include illustrations of an exemplary joint between two panels 302 and 304. The panel 302 includes a deck 318. In an example, the deck 318 can include vapor flow elements, such as vapor flow valves, bubble caps, sieve tray perforations, the like, or a combination thereof. The panel 304 can also include a deck 320. In an example, the deck 320 can include vapor flow elements, such as vapor flow valves, bubble caps, sieve tray perforations, the like, or a combination thereof.

The panel 302 includes a support portion 324 connected to the deck 318 by an offset bend 306. Proximal to the offset bend 306, slots 308 are formed in the panel 302 that open through the panel 302. In addition, each slot can be associated with one or more tabs 310 extending downward toward an underside of the panel 302. In a particular example, the one or more tabs 310 initiate at an edge of the slot 308 proximal to the deck 318 and extend downward relative to a plane of the deck 318. While the tabs and slots are illustrated in a 1:1 relationship, more than one tab can be associated with a slot. The panel 302 can also include a cross support 316 extending along the edge of the panel 302 and extending downward from the support portion 324.

The panel 304 can include strips 312 connected to the deck 320 of the panel 304 by offset bends 322. Proximal to a distal end 326, the strips 312 can define openings 314. While the openings and strips are illustrated in a 1:1 relationship, more than one opening can be defined by a strip. In an example, the number of openings associated with a strip corresponds to the number of tabs associated with a slot.

As illustrated in FIG. 4 and FIG. 5, when the strips 312 of the panel 304 are inserted into the slots 308 of the panel 302, the tabs 310 engage the openings 314 of the strips 312. For example, the tabs 310 can extend into the openings 314 defined by the strips 312. As such, the strips 312 extend under the panel 302, and the support portion 324 extends under the panel 304, for example, extending under the deck 320 of the panel 304.

When joined, the decks 318 and 320 of the respective panels 302 and 304 can be coplanar, depending on the nature of the offset bends 306 and 322. For example, the depth of the offset bend 306 can provide for the top of the deck 318 to be approximately 1 panel thickness higher than the top of the support portion 324. As illustrated, the depth (d) extending between respective center planes of the deck 318 and the support portion 324 is in a range of 0.8 to 1.2 times the thickness of the second panel 304, such as a range of 0.9 to 1.1, or a range of 0.99 to 1.01.

As illustrated in FIG. 5, the tab 310 of the panel 302 extends downward relative to a plane of the deck 318. In particular, relative to a reference plane of the deck 318, the tab 310 can extend downward at an angle a in a range of 30° to 120°, such as a range of 45° to 100°, or a range of 70° to 90°. Optionally, the tab 310 can have a distal end that extends at least to the center plane of the support portion 324. In a particular example, the distal end of the tab 310 can extend downward beyond the center plane of the support portion 324. For example, the difference (e) between the height of the center plane of the support portion 324 and the distal end of the tab 310 can be in a range of 0.1 to 1 times the thickness of the first panel 302.

During assembly, a panel can be secured to a support ring. The panel can include a first portion of a joint at an edge distal from the column wall. A second panel can be secured to the first panel and can include a second portion of the joint. Strips defined at an edge of one of the panels can be inserted into slots disposed at an edge of the other panel. Openings defined by the strips can engage tabs of the opposite panel. Additional panels can be secured at other edges of the panels. Further, a liquid receiving panel can be secured to an orthogonal edge of one or both panels and a downcomer can be secured to another orthogonal edge of one or both panels.

In an example, sheets can be cut and shaped to form the panels. In particular, metal sheets can be cut and shaped in a stamp press. The sheet can be perforated for associated vapor flow elements prior to stamping to cut and shape the sheet into a panel. Alternatively, the panel can be formed in a single stamp press process.

While providing a secure interface between two panels, the joint further provides technical advantages useful vapor-liquid contact systems. For example, owing to the nature of the joint, the open area at the joint is limited, preventing excessive weeping at the joint and preventing uncontrolled vapor flow through the joint. Further, embodiments of the tray and panels including the described joint provides for easier installation, in-column manipulation, maintenance, and replacement. In particular, the trays including panels with the described joint are easier to dismantle for maintenance or for panel replacement.

In a first aspect, a vapor-liquid contact tray includes first and second panels having coplanar respective first and second decks and releasably joinable at a joint formed along overlapping edges of the first and second panels. A plurality of vapor flow elements is disposed in at least one of the first or second decks. The joint can include the first panel including a first offset bend extending from the first deck to a support portion, the support portion to extend to underlie the second panel. A plurality of slots extends through the first panel proximal to the first offset bend. A plurality of tabs are each associated with a slot of the plurality of slots and can extend downward toward an underside of the first panel and can initiate from an edge of the associated slot proximal to the first deck. The second panel includes a plurality of strips. A strip of the plurality of strips has a second offset bend extending from the second deck to a distal portion that is to extend through a slot of the plurality of slots to underlie the first panel. The strip defines an opening. A tab of the plurality of tabs extends through the opening.

In an example of the first aspect, at least a subset of the plurality of vapor flow elements is disposed in the first deck.

In another example of the first aspect and the above examples, at least a subset of the plurality of vapor flow elements is disposed in the second deck.

In a further example of the first aspect and the above examples, a first subset of the plurality of vapor flow elements is disposed in the first deck and a second subset of the plurality of vapor flow elements is disposed in the second deck.

In an additional example of the first aspect and the above examples, a distal end of a tab of the plurality of tabs extends below a plane of the support portion.

In another example of the first aspect and the above examples, the tab extends downward at an angle relative to a plane of the deck in a range of 30° to 120°. For example, the angle is in a range of 70° to 90°.

In a further example of the first aspect and the above examples, the first panel further includes a cross support extending along the overlapping edge and extending downward from an edge of the support portion opposite the first deck.

In an additional example of the first aspect and the above examples, the vapor-liquid contact tray further includes a downcomer positioned at an edge of the first or second panels, optionally, orthogonal to the overlapping edge.

In another example of the first aspect and the above examples, the vapor-liquid contact tray further includes a liquid receiving panel secured to the first or second panels along an edge of the first or second panels, optionally, orthogonal to the overlapping edge.

In a second aspect, a mass transfer column includes a plurality of horizontally extending vapor-liquid contact trays vertically spaced apart relative to one another. At least one contact tray of the plurality of contact trays includes at least two panels and a downcomer. The at least two panels includes first and second panels having coplanar respective first and second decks and releasably joined at a joint formed along overlapping edges of the first and second panels. A plurality of vapor flow elements is disposed in at least one of the first or second decks. The joint includes the first panel including a first offset bend extending from the first deck to a support portion, the support portion to extend to underlie the second panel. A plurality of slots extends through the first panel proximal to the first offset bend. A plurality of tabs are each associated with a slot of the plurality of slots and extend downward toward an underside of the first panel and initiate from an edge of the associated slot proximal to the first deck. The second panel includes a plurality of strips. A strip of the plurality of strips has a second offset bend extending from the second deck to a distal portion that is to extend through a slot of the plurality of slots to underlie the first panel. The strip defines an opening. A tab of the plurality of tabs extends through the opening.

In an example of the second aspect, at least a subset of the plurality of vapor flow elements is disposed in the first deck.

In another example of the second aspect and the above examples, at least a subset of the plurality of vapor flow elements is disposed in the second deck.

In a further example of the second aspect and the above examples, a first subset of the plurality of vapor flow elements is disposed in the first deck and a second subset of the plurality of vapor flow elements is disposed in the second deck.

In an additional example of the second aspect and the above examples, a distal end of a tab of the plurality of tabs extends below a plane of the support portion.

In another example of the second aspect and the above examples, the tab extends downward at an angle relative to a plane of the deck in a range of 30° to 120°.

In a further example of the second aspect and the above examples, the first panel further includes a cross support extending along the overlapping edge and extending downward from an edge of the support portion opposite the first deck.

In an additional example of the second aspect and the above examples, the downcomer is positioned at an edge of the first or second panels, optionally, orthogonal to the overlapping edges.

In another example of the second aspect and the above examples, the mass transfer column further includes a liquid receiving panel secured to the first or second panels along an edge of the first or second panels, optionally, orthogonal to the overlapping edges.

In a third aspect, a method of forming a vapor-liquid contact tray includes tilting a second panel at an angle in relation to a first panel and inserting a plurality of strips of the second panel into a plurality of slots of the first panel. The first panel includes a first offset bend extending from a first deck to a support portion. The plurality of slots extends through the first panel proximal to the first offset bend. A plurality of tabs are each associated with a slot of the plurality of slots and extend downward toward an underside of the first panel and initiate from an edge of the associated slot proximal to the first deck. The second panel includes the plurality of strips. A strip of the plurality of strips has a second offset bend extending from the second deck to a distal portion. The strip defines an opening. A tab of the plurality of tabs extends through the opening. The method further includes maneuvering the first and second panels to place the first and second decks in coplanar relationship to form a joint. Distal ends of the strips of the second panel extend under the first panel. The support portion of the first panel extends under the second panel. The tabs of the first panel engage the openings in the strips of second panel.

In an example of the third aspect, the method further includes securing an edge of the first or second panels to a wall of the column.

In another example of the third aspect and the above examples, the method further includes attaching a downcomer to an edge of the first or second panels, optionally, orthogonal to the joint.

In a further example of the third aspect and the above examples, the method further includes attaching a liquid receiving panel to an edge of the first or second panels, optionally, orthogonal to the joint.

In an additional example of the third aspect and the above examples, the contact tray of the method can include features of the first or second aspects and associated examples.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have bend described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A vapor-liquid contact tray comprising:
   first and second panels having coplanar respective first and second decks and releasably joinable at a joint formed along overlapping edges of the first and second panels;
   a plurality of vapor flow elements disposed in at least one of the first or second decks;
   the joint including:
      the first panel including a first offset bend extending from the first deck to a support portion, the support portion to extend to underlie the second panel, a plurality of slots extending through the first panel proximal to the first offset bend, a plurality of tabs each associated with a slot of the plurality of slots and extending downward toward an underside of the first panel and initiating from an edge of the associated slot proximal to the first deck; and
      the second panel including a plurality of strips, a strip of the plurality of strips having a second offset bend extending from the second deck to a distal portion to extend through a slot of the plurality of slots to underlie the first panel, the strip defining an opening, a tab of the plurality of tabs to extend through the opening.

2. The vapor-liquid contact tray of claim 1, wherein at least a subset of the plurality of vapor flow elements is disposed in the first deck.

3. The vapor-liquid contact tray of claim 1, wherein at least a subset of the plurality of vapor flow elements is disposed in the second deck.

4. The vapor-liquid contact tray of claim 1, wherein a first subset of the plurality of vapor flow elements is disposed in the first deck and a second subset of the plurality of vapor flow elements is disposed in the second deck.

5. The vapor-liquid contact tray of claim 1, wherein a distal end of a tab of the plurality of tabs extends below a plane of the support portion.

6. The vapor-liquid contact tray of claim 1, wherein the tab extends downward at an angle relative to a plane of the deck in a range of 30° to 120°.

7. The vapor-liquid contact tray of claim 1, wherein the first panel further includes a cross support extending along the overlapping edge and extending downward from an edge of the support portion opposite the first deck.

8. The vapor-liquid contact tray of claim 1, further comprising a downcomer positioned at an edge of the first or second panels orthogonal to the overlapping edges.

9. The vapor-liquid contact tray of claim 1, further comprising a liquid receiving panel secured to the first or second panels along an edge of the first or second panels orthogonal to the overlapping edges.

10. A mass transfer column comprising:
    a plurality of horizontally extending vapor-liquid contact trays vertically spaced apart relative to one another, at least one contact tray of the plurality of contact trays including at least two panels and a downcomer, the at least two panels including:

first and second panels having coplanar respective first and second decks and releasably joined at a joint formed along overlapping edges of the first and second panels;

a plurality of vapor flow elements disposed in at least one of the first or second decks;

the joint including:

the first panel including a first offset bend extending from the first deck to a support portion, the support portion to extend to underlie the second panel, a plurality of slots extending through the first panel proximal to the first offset bend, a plurality of tabs each associated with a slot of the plurality of slots and extending downward toward an underside of the first panel and initiating from an edge of the associated slot proximal to the first deck; and the second panel including a plurality of strips, a strip of the plurality of strips having a second offset bend extending from the second deck to a distal portion to extend through a slot of the plurality of slots to underlie the first panel, the strip defining an opening, a tab of the plurality of tabs to extend through the opening.

11. The mass transfer column of claim 10, wherein at least a subset of the plurality of vapor flow elements is disposed in the first deck.

12. The mass transfer column of claim 10, wherein at least a subset of the plurality of vapor flow elements is disposed in the second deck.

13. The mass transfer column of claim 10, wherein a first subset of the plurality of vapor flow elements is disposed in the first deck and a second subset of the plurality of vapor flow elements is disposed in the second deck.

14. The mass transfer column of claim 10, wherein a distal end of a tab of the plurality of tabs extends below a plane of the support portion.

15. The mass transfer column of claim 10, wherein the first panel further includes a cross support extending along the overlapping edge and extending downward from an edge of the support portion opposite the first deck.

16. The mass transfer column of claim 10, wherein the downcomer is positioned at an edge of the first or second panels.

17. The mass transfer column of claim 10, further comprising a liquid receiving panel secured to the first or second panels along an edge of the first or second panels.

18. A method of forming a vapor-liquid contact tray, the method comprising:

tilting a second panel at an angle in relation to a first panel and inserting a plurality of strips of the second panel into a plurality of slots of the first panel;

the first panel including a first offset bend extending from a first deck to a support portion, the plurality of slots extending through the first panel proximal to the first offset bend, a plurality of tabs each associated with a slot of the plurality of slots and extending downward toward an underside of the first panel and initiating from an edge of the associated slot proximal to the first deck;

the second panel including the plurality of strips, a strip of the plurality of strips having a second offset bend extending from the second deck to a distal portion, the strip defining an opening, a tab of the plurality of tabs to extend through the opening; and maneuvering the first and second panels to place the first and second decks in coplanar relationship to form a joint, distal ends of the strips of the second panel extending under the first panel, the support portion of the first panel extending under the second panel, the tabs of the first panel engaging the openings in the strips of second panel.

19. The method of claim 18, further comprising securing an edge of the first or second panels to a wall of the column.

20. The method of claim 18, further comprising attaching a downcomer to an edge of the first or second panels.

* * * * *